United States Patent
Kuhara

(10) Patent No.: US 6,873,767 B2
(45) Date of Patent: Mar. 29, 2005

(54) WAVELENGTH-MULTIPLEXING CONNECTOR, OPTICAL TRANSMISSION DEVICE, AND OPTICAL COMMUNICATION SYSTEM

(75) Inventor: Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/348,475

(22) Filed: Jan. 21, 2003

(65) Prior Publication Data

US 2003/0161583 A1 Aug. 28, 2003

(30) Foreign Application Priority Data

Feb. 27, 2002 (JP) ........................................ 2002-052307

(51) Int. Cl.[7] ................................................ G02B 6/30
(52) U.S. Cl. ............................................ 385/49; 385/45
(58) Field of Search ............................. 385/49, 45, 42, 385/43, 44, 46, 47, 24

(56) References Cited

U.S. PATENT DOCUMENTS

| | | | | |
|---|---|---|---|---|
| 5,532,864 A | * | 7/1996 | Alexander et al. ............. | 398/31 |
| 5,799,120 A | * | 8/1998 | Kurata et al. .................. | 385/45 |
| 5,859,940 A | * | 1/1999 | Takahashi et al. ............. | 385/34 |
| 6,157,760 A | * | 12/2000 | Fujita et al. ................... | 385/49 |
| 6,219,470 B1 | * | 4/2001 | Tu | |
| 6,445,849 B2 | * | 9/2002 | Kinoshita et al. .............. | 385/24 |
| 6,480,647 B1 | * | 11/2002 | Kitamura ....................... | 385/24 |
| 6,760,510 B2 | * | 7/2004 | Kimura ......................... | 385/24 |
| 2001/0055446 A1 | * | 12/2001 | Iwashita et al. ............... | 385/49 |

FOREIGN PATENT DOCUMENTS

| JP | 01079629 A | * | 3/1989 | ............. G01J/1/04 |
|---|---|---|---|---|
| JP | 8-62457 | | 3/1996 | |
| JP | 10048459 A | * | 2/1998 | ........... G02B/6/293 |
| JP | 11-202140 | | 7/1999 | |

* cited by examiner

Primary Examiner—Michael G. Lee
Assistant Examiner—Uyen-Chau N. Le
(74) Attorney, Agent, or Firm—Fish & Richardson P.C.

(57) ABSTRACT

A wavelength-multiplexing connector and a transmitting/receiving part can be easily connected to and disconnected from each other. The wavelength-multiplexing connector comprises a single optical fiber, through which a plurality of optical signals having different wavelengths are transmitted, and a wavelength-multiplexer optically coupled to the optical fiber and capable of optically separating an optical signal having a particular wavelength out of the plurality of optical signals. The wavelength-multiplexer comprises a wavelength division multiplexing filter disposed at a midway of a first light waveguide, and a multilayered film mirror for reflecting, at a midway of a second light waveguide, a signal separated by the wavelength division multiplexing filter.

16 Claims, 9 Drawing Sheets

FIG. 4 ( a )
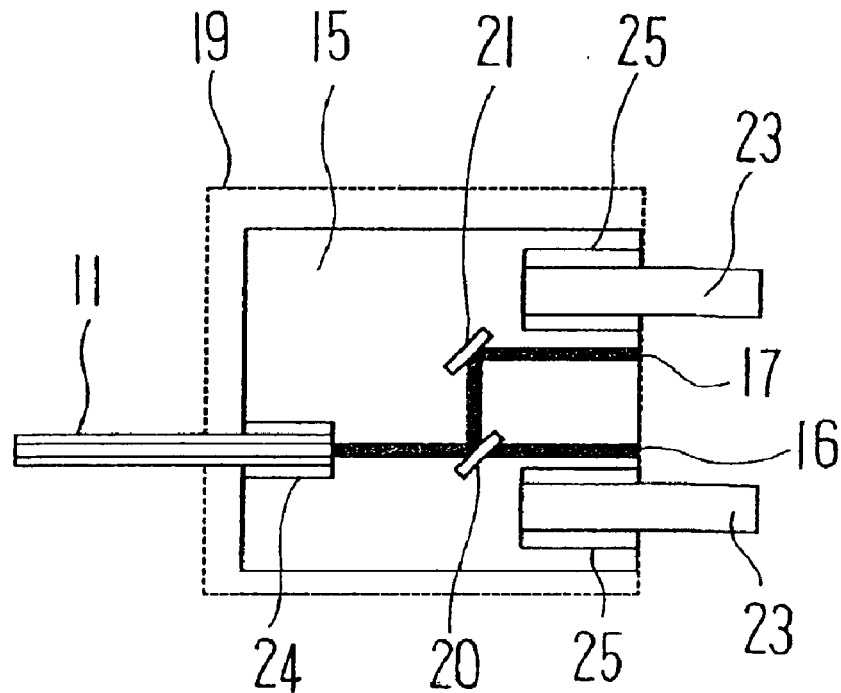
FIG. 4 ( b )
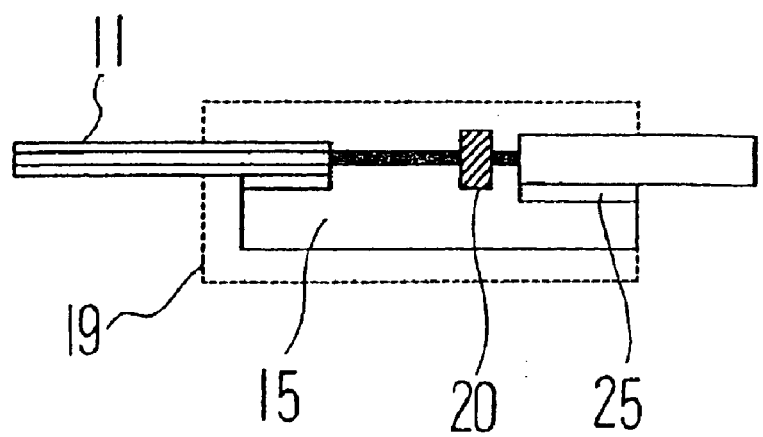

WAVELENGTH-MULTIPLEXING CONNECTOR, OPTICAL TRANSMISSION DEVICE, AND OPTICAL COMMUNICATION SYSTEM

BACKGROUND OF THE INVENTION

1. Field of the Invention

The present invention relates to a wavelength-multiplexing connector, an optical transmission device, and an optical communication system. More particularly, the present invention relates to a wavelength-multiplexing connector enabling a conventional duplex-fiber transceiver to be easily adapted for use in a single-fiber duplex communication system.

2. Description of the Related Art

FIG. 7 shows a currently used optical transceiver. The transceiver of FIG. 7 has a simple construction for performing single-wavelength transmitting/receiving through a couple of optical fibers 50. Each transceiver 1, 2 comprises a laser-diode LD, a driving-circuit 61 for the LD, a photo-diode PD, and a receiving-circuit 62 for the PD. The transceiver has an outer structure in which a receiving receptacle 63 and a transmitting receptacle 64 for connection with optical fibers are projected from a package formed by resin molding as shown in FIG. 8. Most of currently used transceivers are of the above-mentioned type and are employed as optical data links in a 0.8–0.9 $\mu$m wavelength band and a 1.3–1.5 $\mu$m wavelength band, for example, in many cases.

On the other hand, as shown in FIG. 9, an optical transmission device capable of performing transmitting/receiving at the same time through a single fiber has been developed for more effective use of optical fibers. The optical transmission device has a function of separating a transmitting-signal and a receiving-signal from each other by using a wavelength-separator 65 and a mirror 66. For example, a transceiver 1 transmits a wavelength-signal of 1.3 $\mu$m and receives a wavelength-signal of 1.5 $\mu$m. A transceiver 2 transmits and receives those wavelength-signals in a reversed manner.

Such an optical transmission device mainly comprises, as shown in FIG. 10, a light waveguide 80, a wavelength division multiplexing (WDM) filter 81, an optical emitting device 82, and an optical receiving device 83. Those components are constituted as an integral unit (see Japanese Unexamined Patent Application Publication No. 11-202140). The WDM filter 81 shown in FIG. 10 has also the functions of the wavelength-separator 65 and the mirror 66 both shown in FIG. 9.

SUMMARY OF THE INVENTION

However, effective utilization of duplex-fiber transceivers that are widely employed at present cannot be realized by simply employing the optical transmission device capable of transmitting and receiving signals through a single fiber. In order to promote the use of the single-fiber optical transmission device all over the world, a technique enabling the duplex-fiber transceivers to be easily adapted for use in the single-fiber duplex communication system is needed.

Accordingly, it is a main object of the present invention to provide a wavelength-multiplexing connector enabling a conventional duplex-fiber transceiver to be easily adapted for use in a single-fiber duplex communication system, and to provide the optical transmission device and optical communication system that employ such connector.

The present invention achieves the above object by designing a wavelength-multiplexer and a transmitting/receiving part to be independent of each other.

More specifically, a wavelength-multiplexing connector according to the present invention comprises: a single optical fiber through which a plurality of optical signals having different wavelengths are transmitted; a wavelength-multiplexer optically coupled to the optical fiber and capable of optically separating a signal having a particular wavelength out of the plurality of optical signals; and a coupling mechanism for connecting the wavelength-multiplexer with a transmitting/receiving part having transmitting/receiving functions.

An optical transmission device according to the present invention comprises the wavelength-multiplexing connector described above and a transmitting/receiving part that can be easily connected to and disconnected from the wavelength-multiplexing connector, wherein the transmitting/receiving part is provided with an optical emitting device and an optical receiving device.

Further, an optical communication system according to the present invention is constructed such that single-fiber duplex transmitting/receiving can be performed by using the optical transmission device set forth above.

The wavelength-multiplexing connector of the present invention enables a single optical fiber to be connected to the transmitting/receiving part as if it were converted into a fiber cable of duplex-fiber core structure, since the wavelength-multiplexer and the transmitting/receiving part are provided independently such that they are easily connected to and disconnected from each other. Hence, the transmitting/receiving part enables the optical transmission device and the single-fiber duplex optical communication system to be constructed by employing a conventional duplex-fiber transceiver.

The wavelength-multiplexer preferably comprises: a first light waveguide coupled to the optical fiber and formed on a substrate; a wavelength division multiplexing filter structure formed on the substrate and capable of separating a signal of a particular wavelength from the first light waveguide; and a second light waveguide through which the separated signal of the particular wavelength is transmitted.

More practically, the substrate may be a Si-substrate. The light waveguides may be $SiO_2/GeO_2$ or polymer light waveguides. Materials of the polymer light waveguides include, for example, polyimide and fluorinated polyimide.

The wavelength division multiplexing filter structure may be a Mach-Zehnder interferometer formed in parts of the first and second light waveguides, or may comprise a filter provided midway the first light waveguide, and a mirror for reflecting a signal separated by the filter in the course of the second light waveguide.

The coupling mechanism may be achieved by optical fiber ferrules extending from each of the light waveguides, or by guide-pins projecting from an end face of the substrate. Accordingly, the transmitting/receiving part may be provided with receptacles to which the optical fiber ferrules are to be fitted or pin acceptors into which the guide-pins are inserted.

The transmitting/receiving part to be jointed with the wavelength-multiplexing connector has an optical emitting device and an optical receiving device. For example, a transmitting-signal transmitted from the optical emitting device is directed to the single fiber via the first light waveguide. A receiving-signal transmitted through the single optical fiber is separated from other signals by the wavelength division multiplexing filter structure, and directed to the second light waveguide to be introduced to the optical receiving device. The optical emitting device comprises, e.g., an LD, and the optical receiving device comprises, e.g., a PD. Further, at least either of a driving-IC for the optical emitting device and a signal-amplifier for the optical receiving device may be provided.

The optical transmission device employing the wavelength-multiplexing connector preferably is plastic-molded for covering the outer periphery of the wavelength-multiplexing connector and the transmitting/receiving part, respectively. The plastic molding provides mechanical protection for the mounted parts.

Thus, according to the present invention, the wavelength-multiplexer and the transmitting/receiving part are provided independently such that they can be easily connected to and disconnected from each other. Therefore, the single optical fiber can be coupled to the transmitting/receiving part in a state as if it were converted into a practically duplex-fiber structure. As a result, the optical transmitting device and the single-fiber duplex optical communication system can be constructed by employing a conventional duplex-fiber transceiver as the transmitting/receiving part.

Further, although a couple of optical fibers have been employed to perform the transmitting/receiving in the past, the present invention makes it possible to perform the transmitting/receiving with a single optical fiber and to achieve a transmission capacity twice as much as that obtained in the past.

BRIEF DESCRIPTION OF THE DRAWINGS

FIG. 4(*a*) is a plan view showing a general construction of the wavelength-multiplexing connector of the present invention in which guide-pins are used for coupling with a transmitting/receiving part, and FIG. 4(*b*) is a side view of the connector.

DETAILED DESCRIPTION OF THE INVENTION

Detailed description of the present invention will be described below.

First Embodiment

Figure 1A:
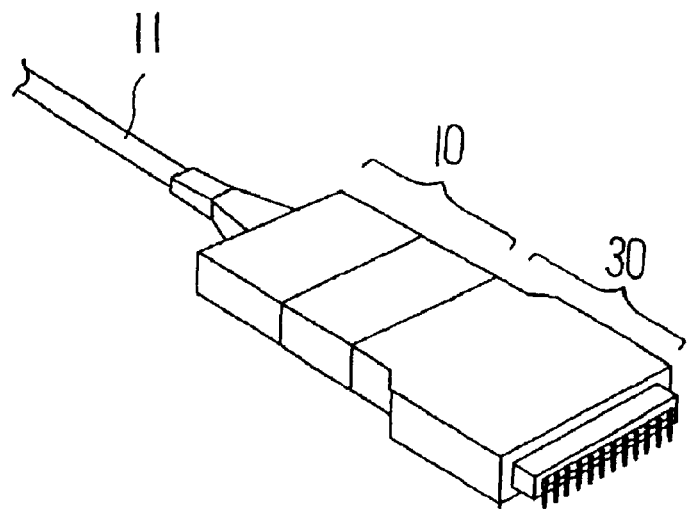
FIG. 1(*a*) is a perspective exterior view of a wavelength-multiplexing connector of the present invention, and FIG. 1(*b*) is a longitudinal cross-sectional view showing a basic construction of the connector.
Figure 1B:
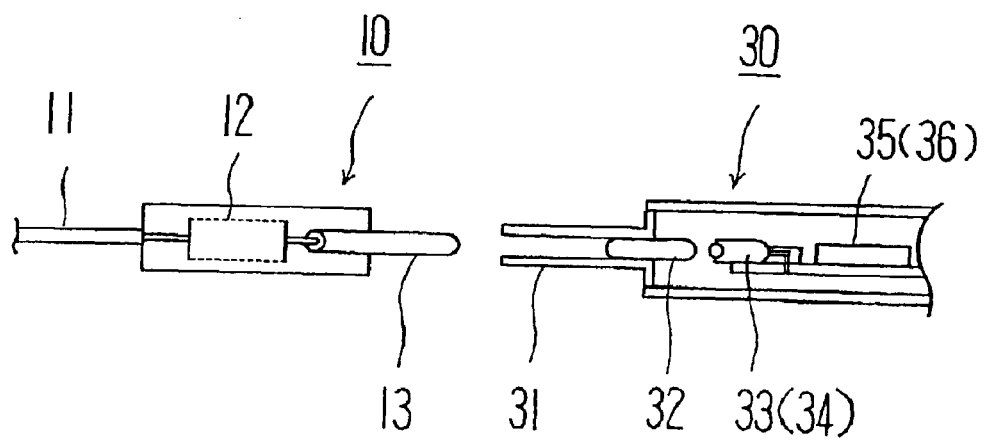

FIG. 1(*a*) is a perspective view showing a basic construction of an optical transmission device according to the present invention, and FIG. 1(*b*) is a longitudinal cross-section thereof. The optical transmission device comprises a wavelength-multiplexing connector 10 and a transmitting/receiving part 30 coupled with the connector 10. The wavelength-multiplexing connector 10 comprises a single optical fiber 11, through which a plurality of optical signals having different wavelengths are transmitted, and a wavelength-multiplexer 12, which is optically coupled to the optical fiber 11 and optically separates a signal of particular wavelength from the plurality of optical signals.

The wavelength-multiplexer 12, whose construction will be described later in connection with another embodiment, basically comprises a duplex-fiber light transmission medium for separating a transmitting-signal and a receiving-signal and transmitting the separated signals respectively. The wavelength-multiplexer 12 further includes a jointing mechanism for coupling with the transmitting/receiving part 30 having transmitting/receiving functions. One example of the jointing mechanism is a pair of optical fiber ferrule 13. The optical fiber ferrules 13 are connected to respective light transmission mediums for the transmitting-signal and the receiving-signal.

On the other hand, the transmitting/receiving part 30 includes receptacles 31 to be fitted to the pair of optical fiber ferrules 13. The receptacles 31 are also provided with respective optical fiber ferrules 32. Though only one optical fiber ferrule appears in FIG. 1(*b*), there is in fact another optical fiber ferrule unseen in a direction perpendicular to the face of the drawing page. An optical emitting device and an optical receiving device are optically coupled to each of the optical fiber ferrules 32. In this embodiment, an LD 33 is employed as the optical emitting device and a PD 34 is employed as the optical receiving device. Further, the transmitting/receiving part 30 includes a driving-IC (Integrated Circuit) 35 for the optical emitting device and an amplifier 36 for amplifying signals received by the optical receiving device.

Thus, the wavelength-multiplexer 12 for converting transmission medium from the single optical fiber 11 into the duplex-fiber light transmission is provided independently of the transmitting/receiving part 30 having the optical emitting device and the optical receiving device, and thereby the conventional duplex-fiber transceiver can be easily adapted for use in the single-fiber duplex communication system.

Second Embodiment

Figure 2:
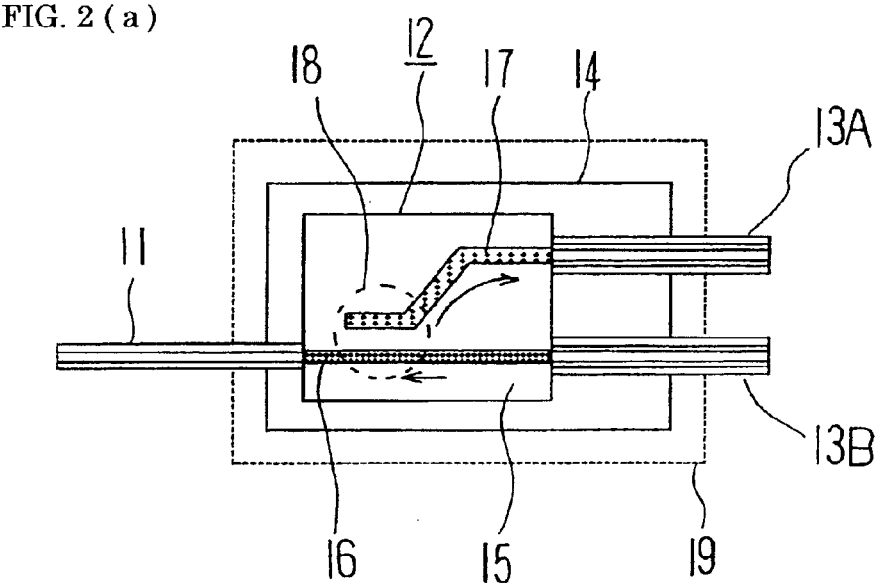
FIG. 2(*a*) is a plan view showing a general construction of the wavelength-multiplexing connector of the present invention, which utilizes a Mach-Zehnder interferometer, and FIG. 2(*b*) is a side view of the connector.
Figure 2:
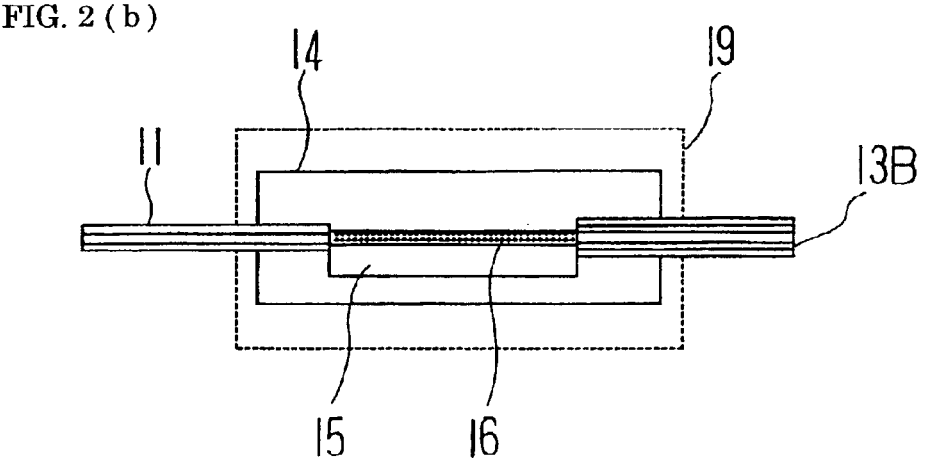

A description is now made of a wavelength-multiplexing connector of the present invention, which utilizes a Mach-Zehnder interferometer. FIG. 2(*a*) is a plan view showing a general construction of the connector, and FIG. 2(*b*) is a side view thereof.

The wavelength-multiplexing connector comprises a single optical fiber 11, through which a plurality of optical signals having different wavelengths are transmitted, and a wavelength-multiplexer 12, which is optically coupled to the optical fiber 11 and optically separates a signal having a particular wavelength out of the plurality of optical signals.

In this embodiment, a Si-bench 15 is disposed on a ceramic- or resin-substrate 14. A first light waveguide 16 and a second light waveguide 17 adjacent to the first light waveguide 16 are formed on the Si-bench 15. The Si-bench 15 can be processed with high accuracy on the order of $\mu$m using the photolithography or etching technique, and light waveguides can be easily formed on the Si-bench with high accuracy. The second light waveguide 17 is formed as a transmission path whose one end approaches the first light waveguide 16 and whose opposite end is distanced from the first light waveguide 16 such that a portion of the second light waveguide 17 dose to the first light waveguide 16 constitutes a Mach-Zehnder interferometer 18. Those first and second light waveguides 16, 17 are connected to optical fiber ferrules 13A, 13B, respectively. The optical fiber ferrules 13A and 13B serve as a jointing mechanism for coupling with a transmitting/receiving part (not shown). Of those optical fiber ferrules, the ferrule 13A is a transmission path for a receiving-signal and the ferrule 13B is a transmission path for a transmitting-signal.

More specifically, receiving-signals transmitted through the single optical fiber 11 are transferred to the second light waveguide 17 through the Mach-Zehnder interferometer 18 and then introduced into the optical receiving device of the transmitting/receiving part (not shown) through the optical fiber ferrule 13A. On the other hand, the transmitting-signal outputted from the optical emitting device of the transmitting/receiving part (not shown) is directed to the single optical fiber 11 through the optical fiber ferrule 13B and the first light waveguide 16. Thus, the transmitting/receiving can be performed with the wavelength of the receiving-signal set to 1.5 $\mu$m and the wavelength of the transmitting-signal set to 1.3 $\mu$m for example. The outer periphery of the connector is covered with a resin molding 19.

In this manner, the wavelength-multiplexing connector utilizing the Mach-Zehnder interferometer enables the conventional duplex-fiber transceiver to be easily adapted for use in the single-fiber duplex communication system. Particularly, with the use of light waveguides, the connector can be manufactured at a high accuracy.

Third Embodiment

Figure 3:
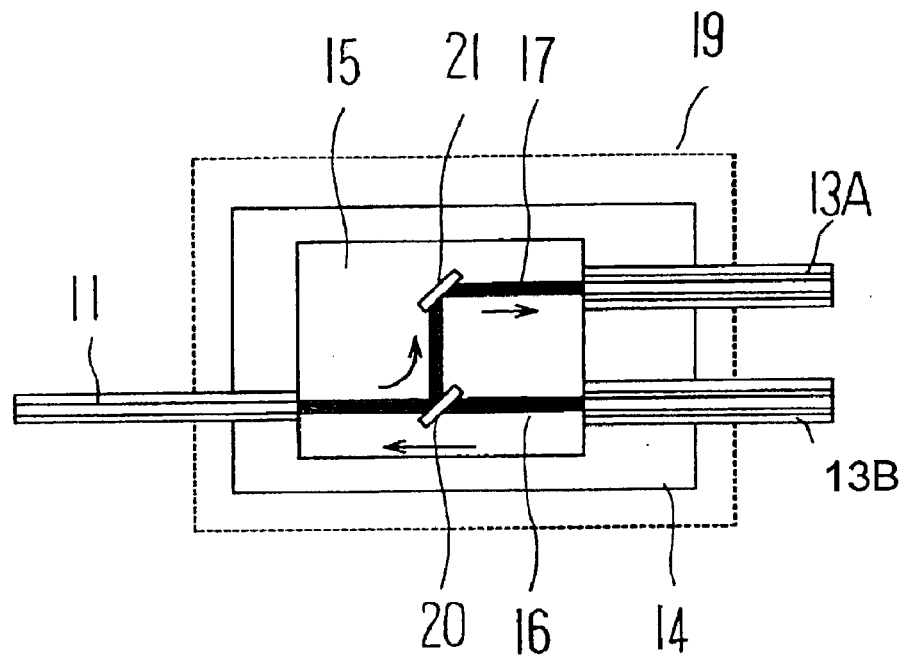
FIG. 3(*a*) is a plan view showing a general construction of the wavelength-multiplexing connector of the present invention in which a wavelength-multiplexer comprises a filter and a mirror, and FIG. 3(*b*) is a side view of the connector.
Figure 3:
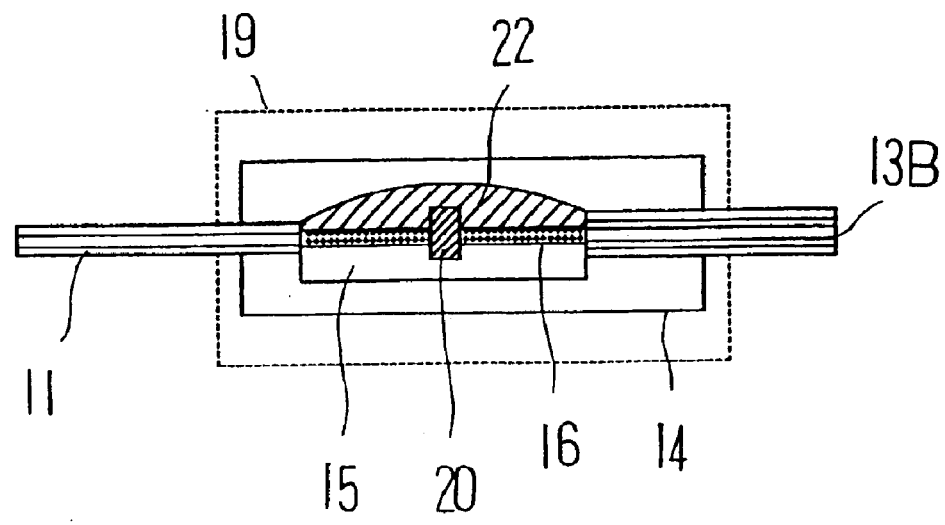

A description is now made of a wavelength-multiplexing connector of the present invention, in which a wavelength-multiplexer comprises a filter and a mirror. FIG. 3(a) is a plan view showing a general construction of the connector, and FIG. 3(b) is a side view thereof. In these figures the same components as those in FIGS. 2(a) and 2(b) are denoted by the same numbers.

In the wavelength-multiplexing connector of this third embodiment, a filter and a mirror are employed instead of the Mach-Zehnder interferometer in the second embodiment. More specifically, a wavelength division multiplexing filter 20 formed of a dielectric film multilayer is disposed at a midway a linear first light waveguide 16, and a multilayered film mirror 21 is disposed at a midway of an L-shaped second light waveguide 17 branched from the first light waveguide 16. The multilayered film mirror 21 may be made of a metallic multilayered film. The wavelength division multiplexing filter 20 introduces, to the second light waveguide 17 side, only a receiving-signal among signals transmitted through the single optical fiber 11, and the multilayered film mirror 21 reflects the receiving-signal such that the receiving signal is introduced to an optical receiving device (not shown) via the optical fiber ferrule 13A. On the other hand, the transmitting-signal outputted from an optical emitting device (not shown) is transmitted to the single optical fiber 11 via the optical fiber ferrule 13B, the first light waveguide 16, and the wavelength division multiplexing filter 20. A potting 22 made of a silicone-transparent resin, for example, is applied onto a Si-bench so as to fill gaps between protective films and the devices. As in the second embodiment, the outer periphery of the connector is covered with a resin molding 19.

Thus, the wavelength-multiplexing connector utilizing the mirror and the filter enables the conventional duplex-fiber transceiver to be easily adapted for use in a single-fiber duplex communication system. Particularly, with the construction of this embodiment, it is possible to easily manufacture the connector, since the filter and the mirror are mounted in grooves formed in the Si-bench.

Fourth Embodiment

A description is now made of a wavelength-multiplexing connector of the present invention, in which guide-pins are employed for jointing with a transmitting/receiving part. FIG. 4(a) is a plan view showing a general construction of the connector, and FIG. 4(b) is a side view thereof. In these figures the same components as those in FIGS. 2(a) and 2(b) are denoted by the same numbers.

The wavelength-multiplexing connector of the fourth embodiment employs a pair of guide-pins 23 as a jointing mechanism for coupling with the transmitting/receiving part, instead of the optical fiber ferrules in the third embodiment. More specifically, a V-groove 24 is formed on one side of the top face of a Si-bench 15, and a single-fiber optical fiber 11 is disposed in the V-groove 24. A pair of V-grooves 25 are formed on the other side of the top face of the Si-bench 15, and the guide-pins 23 are disposed in the respective V-grooves 25.

As in the third embodiment, a linear first light waveguide 16 provided on the Si-bench 15 is optically coupled to an end of the single optical fiber 11, and a wavelength division multiplexing filter 20 is formed at a midway of the first light waveguide 16, while a mirror 21 is disposed at a midway of a second light waveguide 17 branched from the first light waveguide 16.

Further, a pin acceptor for the guide-pin 23 is formed in the transmitting/receiving part (not shown), and the guide-pin 23 is inserted in the pin acceptor. Ends of both the light waveguides 16, 17 are exposed at an end face of the Si-bench 15 and are optically coupled to corresponding light waveguides (not shown) in the transmitting/receiving part. The light waveguides in the transmitting/receiving part are also exposed at an end face thereof in the same manner as the light waveguide in the wavelength-multiplexing connector.

Thus, with the arrangement of this fourth embodiment, the guide-pins can be utilized as a jointing mechanism. In particular, the wavelength-multiplexing connector and the transmitting/receiving part can be coupled together with high accuracy by fitting the guide-pins to the V-grooves formed on the Si-bench.

Fifth Embodiment

Figure 5:
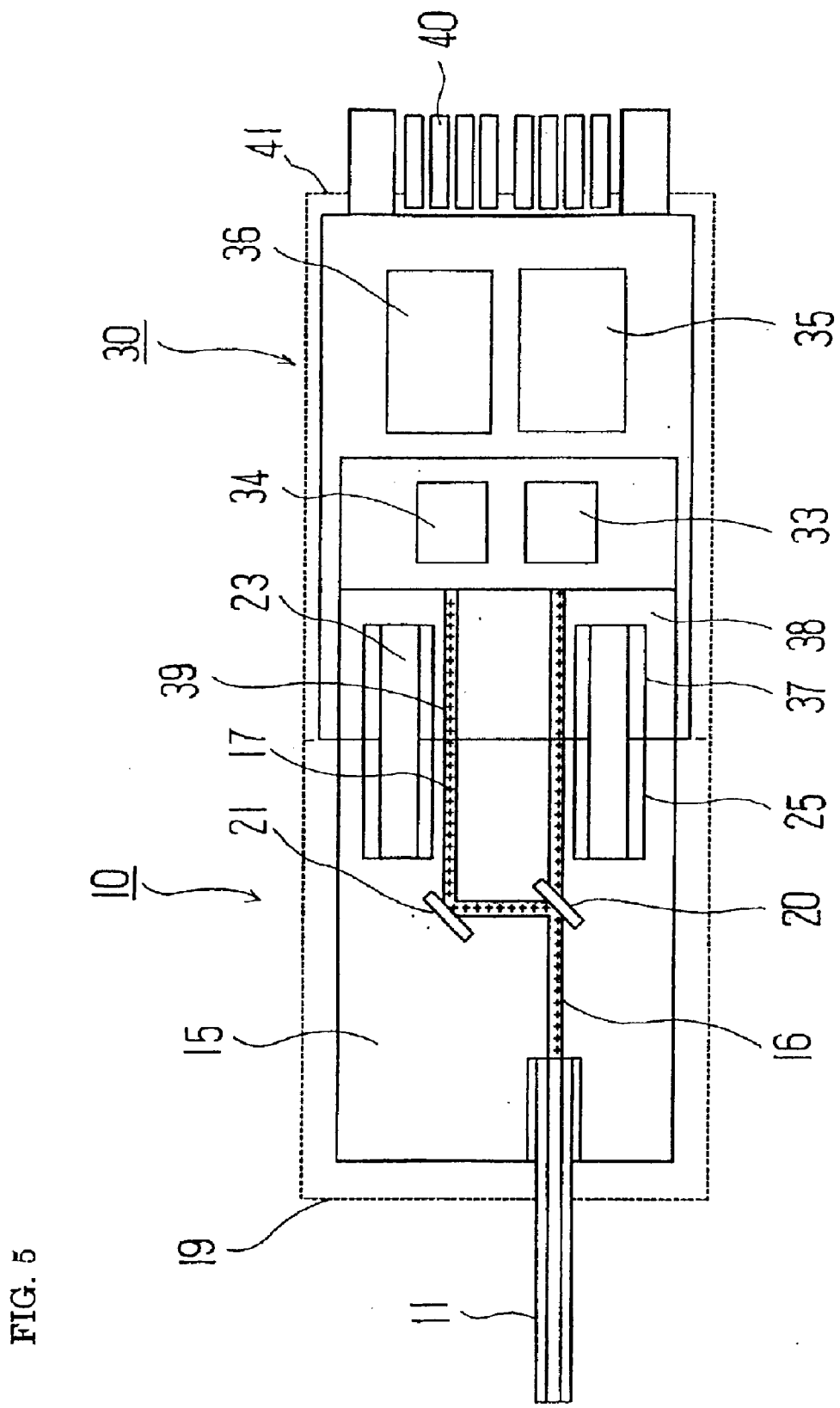
FIG. 5 is a plan view of an optical transmission device of the present invention.

A description is now made of an optical transmission device comprising the wavelength-multiplexing connector and the transmitting/receiving part described above in the fourth embodiment. FIG. 5 is a plan view of the optical transmission device of this fifth embodiment. The connector has the same construction as that in the fourth embodiment, and hence a transmitting/receiving part 30 is primarily described here.

The transmitting/receiving part 30 has a Si-substrate 38 in which a pair of pin acceptors 37 are formed. A wavelength-multiplexing connector 10 and the transmitting/receiving part 30 are coupled together by inserting the guide-pins 23, which are provided on the connector of the fourth embodiment, into the pin acceptors 37 of the Si-substrate 38.

Also, a pair of light waveguides 39 are formed in the Si-substrate 38. Ends of the pair of light waveguides 39 are exposed at an end face of the Si-substrate 38 and are optically coupled to first and second light waveguides 16, 17 in the wavelength-multiplexing connector, respectively. A PD 34 serving as an optical receiving device and an LD 33 serving as an optical emitting device are optically coupled to the corresponding light waveguides 39 in the transmitting/receiving part 30. In this embodiment, an amplifier 36 for amplifying a signal received by the PD 34 and a driving-IC 35 for the LD 33 are further mounted in the transmitting/receiving part 30. Such structure enables the optical transmission device to be more compact and adaptable for high-speed operation. From the end face opposed to the pin receptors 37 of the transmitting/receiving part 30, lead pins 40 of a lead frame are projected for connection with a downstream circuit. Though not shown in the drawing, the individual devices are interconnected by wire bonding. Gaps between the light waveguides and the PD 34, the LD 33, etc. are filled by potting a transparent silicone resin or the like, and the transmitting/receiving part 30 is entirely covered with, e.g., an epoxy resin 41 by transfer-molding.

Thus, by jointing the wavelength-multiplexing connector of the present invention with the transmitting/receiving part having the optical receiving device and the optical emitting device, the conventional duplex-fiber transceiver can be used for constructing a single-fiber transmitting/receiving system.

Sixth Embodiment

Figure 6:
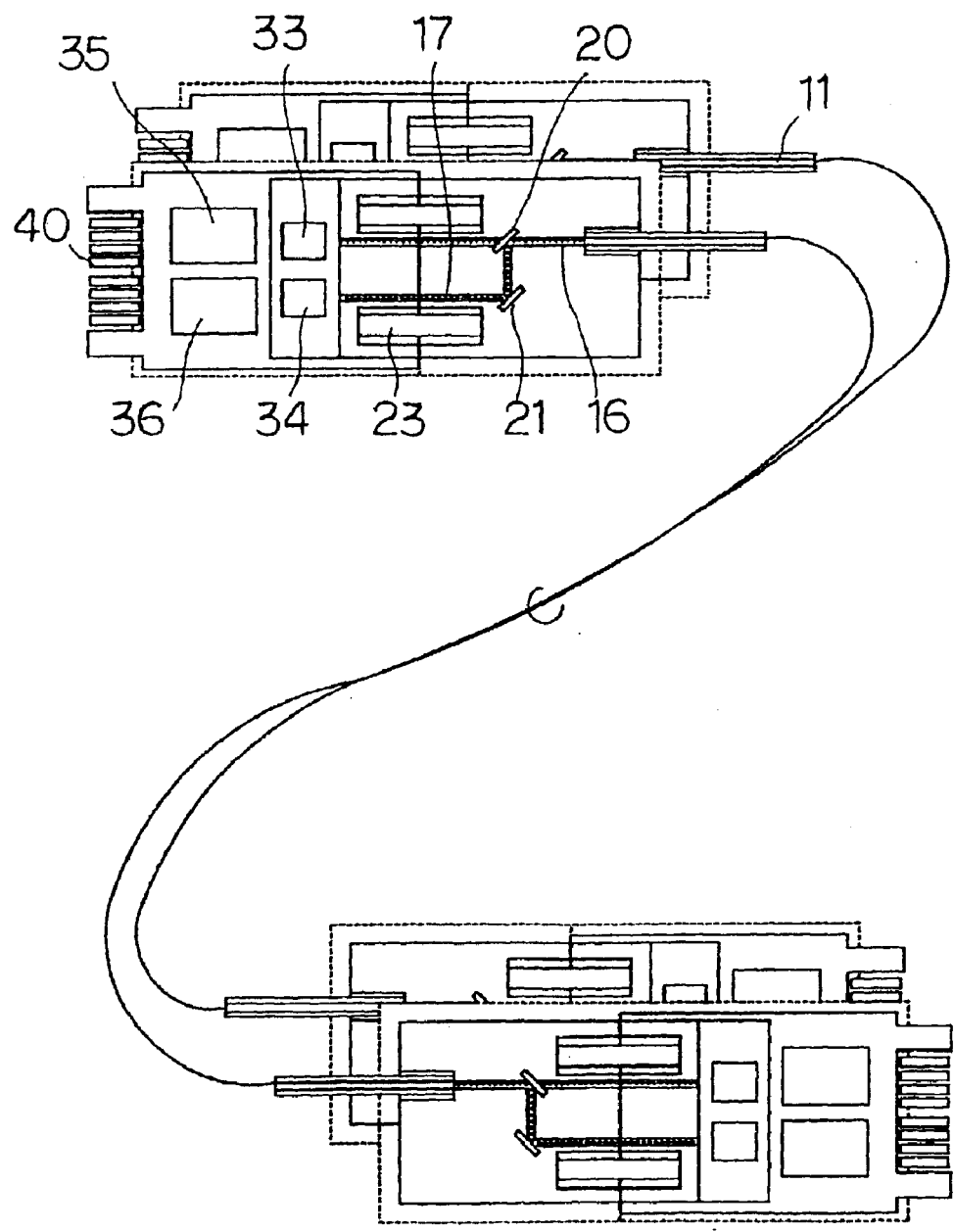
FIG. 6 is a schematic view showing a construction of an optical communication system of the present invention.
Figure 7:
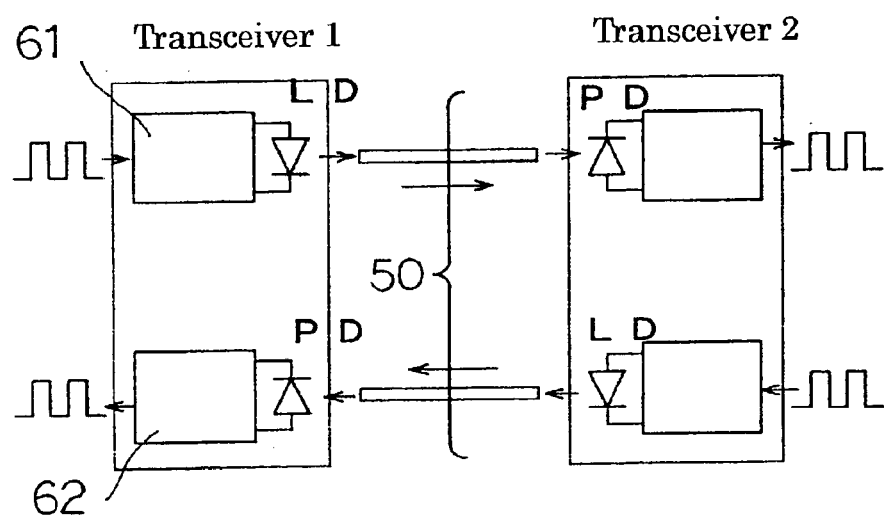
FIG. 7 is a schematic view showing a construction of a conventional optical transmission device using duplex optical fibers.
Figure 8:
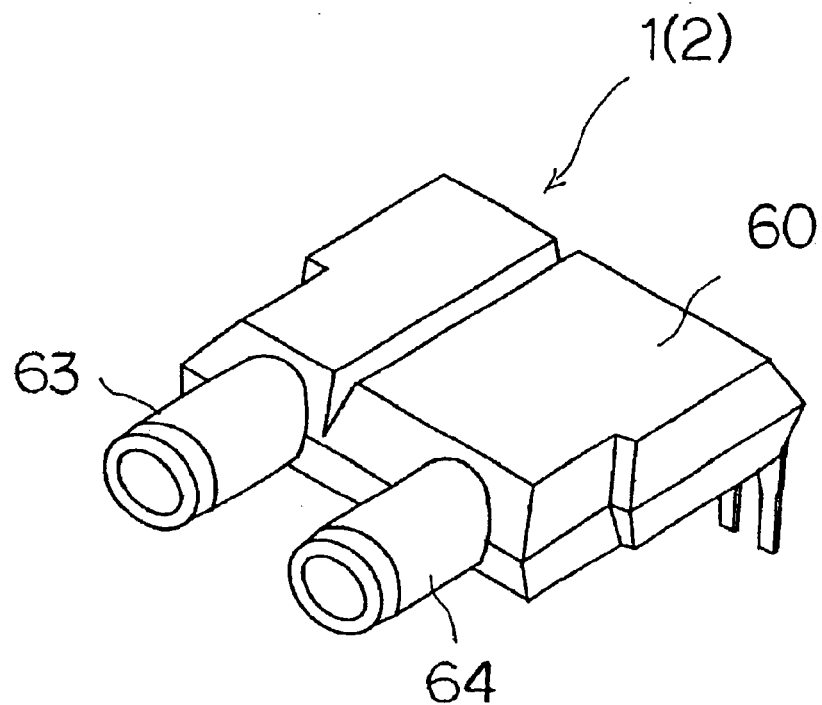
FIG. 8 is a perspective exterior view of the device shown in FIG. 7.
Figure 9:
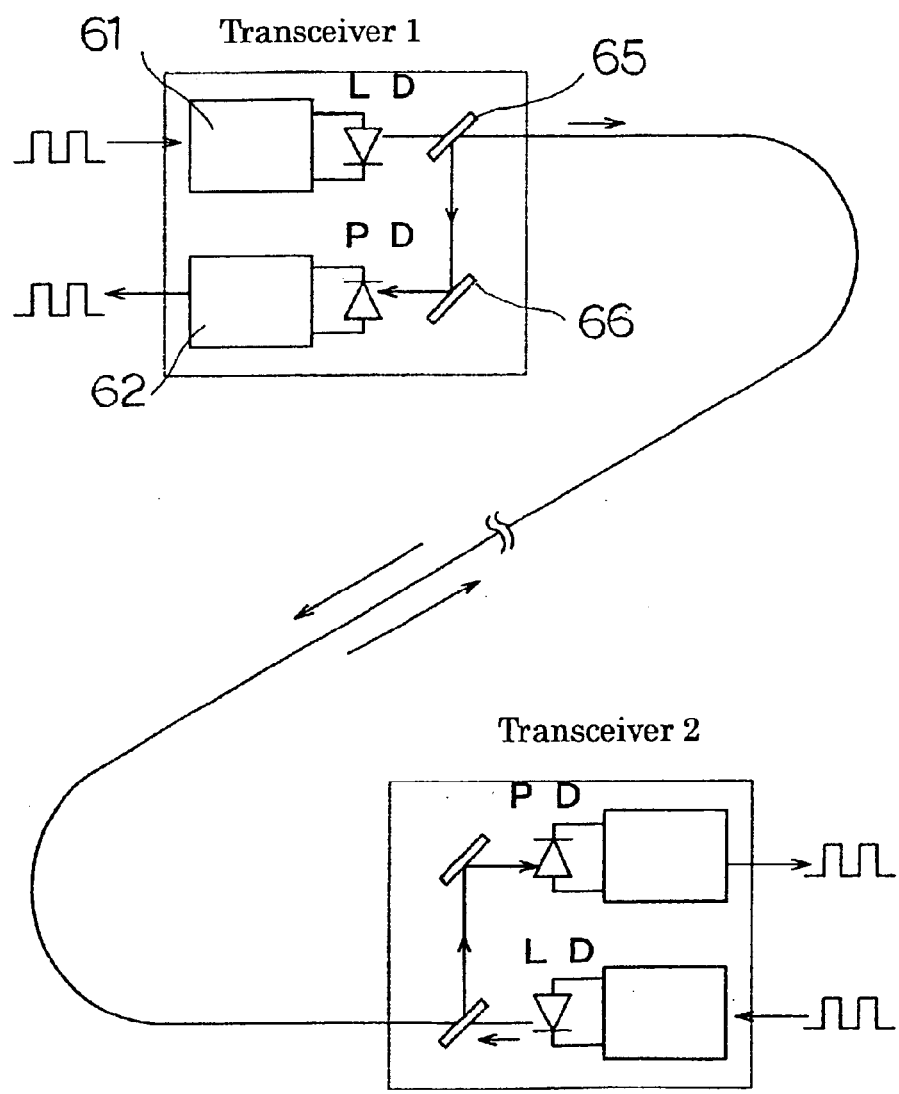
FIG. 9 is a schematic view showing a construction of a communication system employing a conventional single-fiber optical transmission device.
Figure 10:
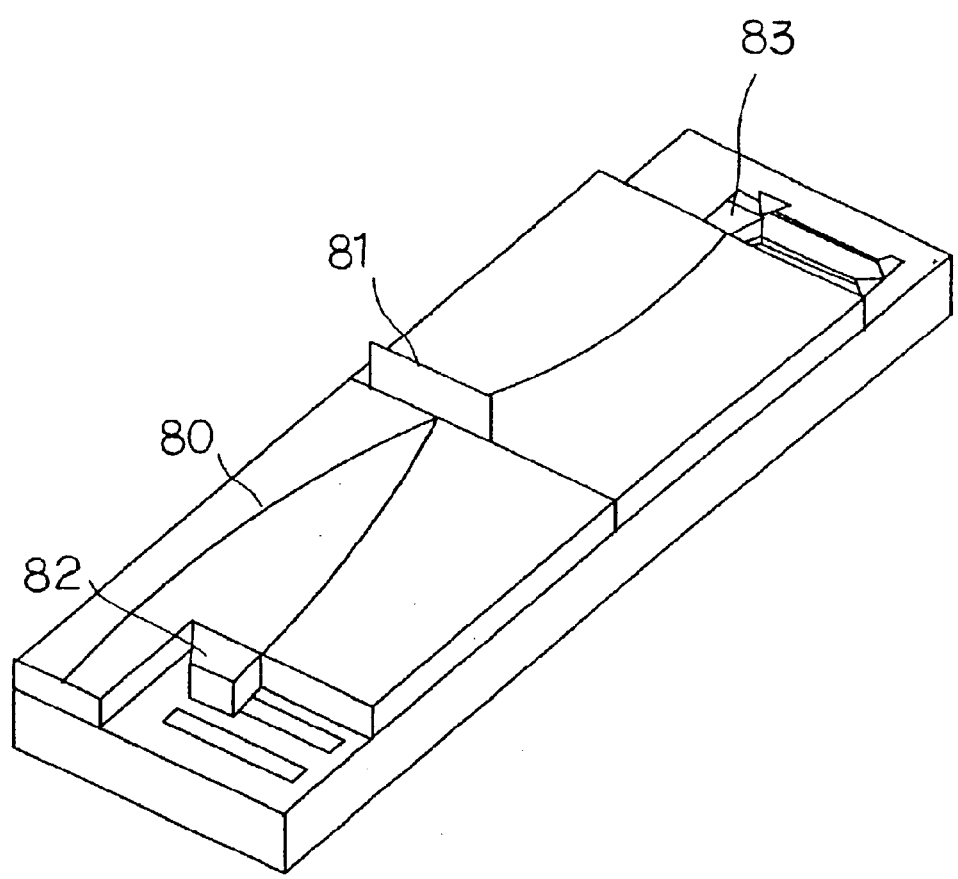
FIG. 10 is a schematic view showing a construction of a conventional single-fiber optical transmitting/receiving device.

A description is now made of one example of an optical communication system employing a plurality of optical transmission devices of the fifth embodiment. FIG. 6 shows a general construction of the optical communication system. In the figure, the same components as those in FIG. 5 are denoted by the same numbers. By employing a pair of optical transmission devices of the fifth embodiment in an optically opposed relation, a single-fiber optical communication system can be easily constructed. On that occasion, the transmission capacity can be doubled without adding another optical fiber.

What is claimed is:

1. A wavelength-multiplexing connector comprising:
   a single optical fiber for transmitting a plurality of optical signals having different wavelengths;
   a wavelength-multiplexer optically coupled to said optical fiber and optically separating a signal of a particular wavelength from the plurality of optical signals; and
   a jointing mechanism for connecting said wavelength-multiplexer with a transmitting and receiving part having an optical emitting device and optical receiving device;
   wherein said wavelength-multiplexer comprises:
      a first light waveguide coupled to said optical fiber and formed on a substrate;
      a wavelength division multiplexing filter structure formed on the substrate, wherein the filter structure separates a signal having a particular wavelength at an angle of about 90-degrees from the first light waveguide; and
      a second light waveguide through which the separated signal of the particular wavelength is transmitted; and
   wherein the filter structure comprises a filter provided midway of said first light wave guide, and a mirror for reflecting a signal, separated by said filter, at an angle of about 90-degrees in the course of said second light waveguide.

2. A wavelength-multiplexing connector according to claim 1, wherein said jointing mechanism includes an optical fiber ferrule extending from each of said light waveguides.

3. A wavelength-multiplexing connector according to claim 1, wherein said jointing mechanism includes guide-pins projecting from an end face of said substrate.

4. A wavelength-multiplexing connector according to claim 1, wherein said substrate is a Si-substrate, and said light waveguides are $SiO_2/GeO_2$.

5. A wavelength-multiplexing connector according to claim 1, wherein said substrate is a Si-substrate, and said light waveguides are polymer light waveguides.

6. An optical transmission device comprising:
   a wavelength-multiplexing connector according to claim 1; and
   a transmitting and receiving part that can be connected to and disconnected from said wavelength-multiplexing connector, wherein
   said transmitting and receiving part is equipped with an optical emitting device and an optical receiving device.

7. An optical transmitting device according to claim 6, further comprising at least one of a driving-IC for said optical emitting device and a signal-amplifier for said optical receiving device.

8. An optical communication system wherein the system is constructed to perform single-fiber duplex transmitting/receiving by using the optical transmitting device according to claim 7.

9. An optical transmitting device according to claim 6, wherein each of said wavelength-multiplexing connector and said transmitting/receiving section is plastic-molded for covering the surroundings thereof.

10. An optical communication system wherein the system is constructed to perform single-fiber duplex transmitting/receiving by using the optical transmitting device according to claim 9.

11. An optical communication system wherein the system is constructed to perform single-fiber duplex transmitting/receiving by using the optical transmitting device according to claim 6.

12. The optical transmission device according to claim 6 wherein the transmitting and receiving part comprises a duplex-fiber transceiver.

13. The optical transmission device according to claim 6 wherein the transmitting and receiving part is is connected by the jointing mechanism to one end of the wavelength multiplexer.

14. The wavelength-multiplexing connector according to claim 1 wherein the wavelength division multiplexing filter structure is arranged at 45° relative to the first light waveguide.

15. The wavelength-multiplexing connector according to claim 1 wherein the transmitting and receiving part comprises a duplex-fiber transceiver.

16. The wavelength-multiplexing connector according to claim 1 wherein the transmitting and receiving part is connected by the jointing mechanism to one end of the wavelength multiplexer.

* * * * *

UNITED STATES PATENT AND TRADEMARK OFFICE
CERTIFICATE OF CORRECTION

PATENT NO. : 6,873,767 B2
DATED : March 29, 2005
INVENTOR(S) : Yoshiki Kuhara

It is certified that error appears in the above-identified patent and that said Letters Patent is hereby corrected as shown below:

Column 8,
Line 5, change "wave guide" to -- waveguide --.

Signed and Sealed this

Eleventh Day of October, 2005

JON W. DUDAS
*Director of the United States Patent and Trademark Office*